US011062461B2

(12) United States Patent
Karasev et al.

(10) Patent No.: US 11,062,461 B2
(45) Date of Patent: Jul. 13, 2021

(54) POSE DETERMINATION FROM CONTACT POINTS

(71) Applicant: Zoox, Inc., Menlo Park, CA (US)

(72) Inventors: Vasiliy Karasev, San Francisco, CA (US); Juhana Kangaspunta, San Francisco, CA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/814,870

(22) Filed: Nov. 16, 2017

(65) Prior Publication Data

US 2019/0147600 A1    May 16, 2019

(51) Int. Cl.
G06T 7/246        (2017.01)
G06K 9/00         (2006.01)
G06T 15/20        (2011.01)
G06T 17/20        (2006.01)

(52) U.S. Cl.
CPC .......... *G06T 7/248* (2017.01); *G06K 9/00805* (2013.01); *G06T 15/205* (2013.01); *G06T 17/20* (2013.01)

(58) Field of Classification Search
CPC ....... G06T 7/248; G06T 17/20; G06T 15/205; G06K 9/00805
See application file for complete search history.

(56) References Cited

U.S. PATENT DOCUMENTS

| 5,974,169 | A | 10/1999 | Bachelder | |
| 2004/0252863 | A1* | 12/2004 | Chang | G06K 9/00805 382/104 |
| 2010/0094590 | A1* | 4/2010 | Ozonat | G06F 11/3452 702/179 |
| 2014/0324249 | A1* | 10/2014 | Lacaze | G05D 1/0038 701/2 |

(Continued)

FOREIGN PATENT DOCUMENTS

CN        1432969 A        7/2003

OTHER PUBLICATIONS

Chen et al, "Multi-View 3D Object Detection Netowrk for Autonomous Driving", ArXiv:1611.07759v3 [cs.CV], Jun. 22, 2017, 9 pages.

(Continued)

*Primary Examiner* — John W Lee
(74) *Attorney, Agent, or Firm* — Lee & Hayes, P.C.

(57) ABSTRACT

An object position and/or orientation can be determined based on image data and object contact points. Image data can be captured representing an object, such as a vehicle. Vehicle contact points can be identified in the image data representing wheel contacts with the ground. For an individual vehicle contact point (e.g., a left-front wheel of the second vehicle), a ray can be determined that emanates from the image sensor and passes through the vehicle contact point. To determine a location and velocity of the vehicle, the ray can be unprojected onto a three-dimensional surface mesh, and an intersection point between the ray and the (Continued)

three-dimensional surface mesh can be used as an initial estimate for the projected location of the vehicle contact point in the world. The estimated location can be adjusted based on various cost functions to optimize an accuracy of the locations of the estimated vehicle contact points.

19 Claims, 9 Drawing Sheets

(56) References Cited

U.S. PATENT DOCUMENTS

| | | |
|---|---|---|
| 2015/0302611 A1* | 10/2015 | Fan .......................... G06K 9/52 382/104 |
| 2017/0297568 A1 | 10/2017 | Kentley et al. |
| 2018/0246515 A1* | 8/2018 | Iwama ................. G05D 1/0246 |
| 2018/0293445 A1* | 10/2018 | Gao .......................... G08G 1/16 |

OTHER PUBLICATIONS

Mousavian et al, "3D Bounding Box Estimation Using Deep Learning and Geometry", ArXiv: 1612.00496v2, Apr. 10, 2017, 10 pages.

Pavlakos et al, "6-DoF Object Pose from Semantic Keypoints", ArXiv: 1703 .04670v I [ cs.CV], Mar. 14, 2017, 8 pages.

PCT Search Report and Written Opinion dated Feb. 7, 2019 for PCT Application No. PCT/US2018/056903, 7 pages.

* cited by examiner

POSE DETERMINATION FROM CONTACT POINTS

BACKGROUND

Machine vision systems can capture data of an environment to determine the presence of objects and obstacles in the environment. Such machine vision systems often use cameras to capture a two-dimensional representation of an environment. However, the two-dimensional representation of objects is often insufficient to accurately determine information regarding the location, size, or motion information associated with the various objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
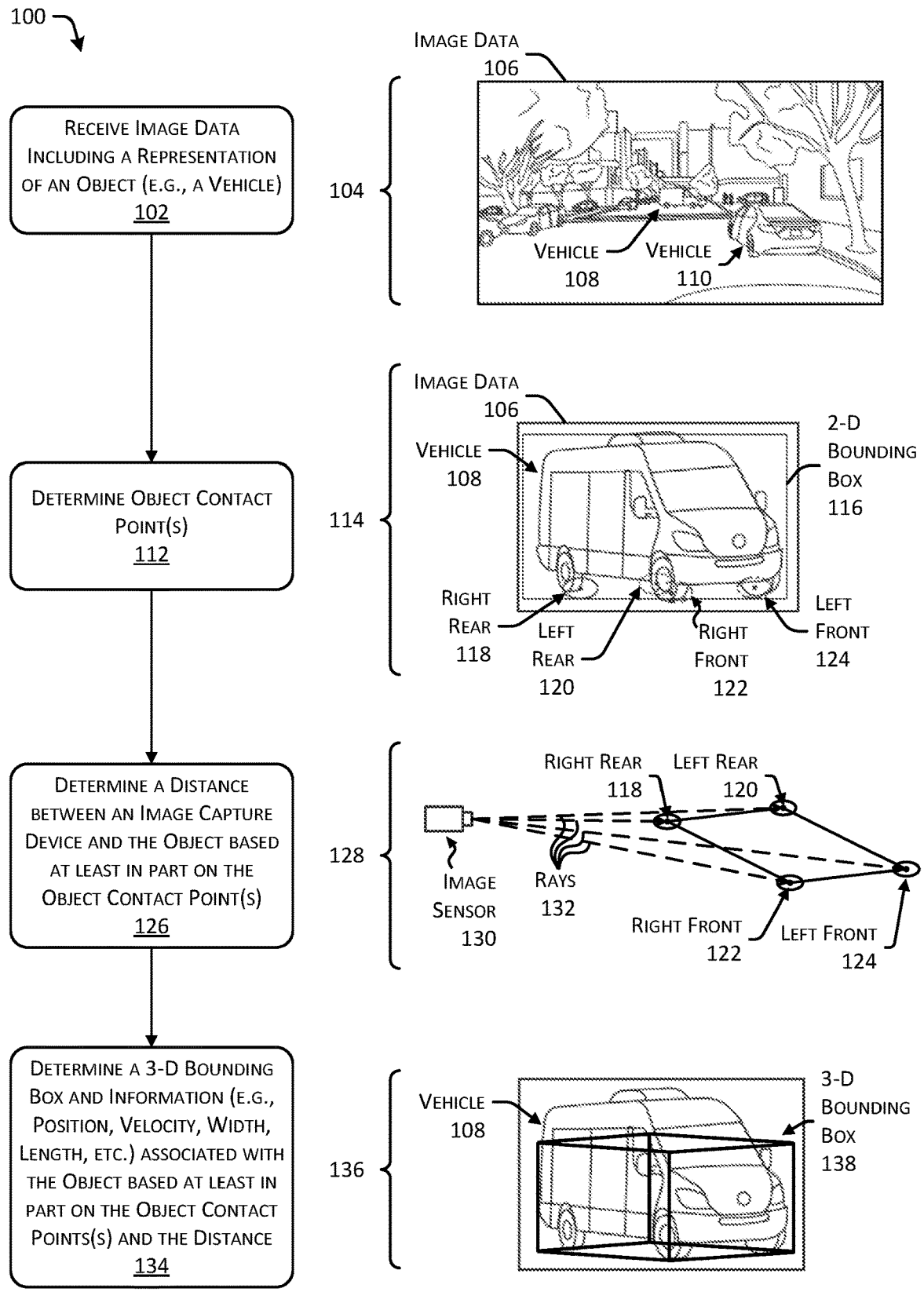
FIG. 1 illustrates a pictorial flow diagram of an example process for determining a three-dimensional bounding box associated with an object orientation based on image data and object contact points, in accordance with embodiments of the disclosure.

This disclosure describes methods, apparatuses, and systems for determining an object position and/or orientation based on image data and object contact points. In some instances, the object position and/or orientation can be defined by, for example, a three-dimensional bounding box. For example, an autonomous vehicle can include an image sensor to capture image data representing an environment. A detection component can detect an object, such as another vehicle, represented in the image data, and can provide the image data to an object contact point component that can identify contact points of the vehicle and the surface within the image. For example, the object contact point component can include a machine learning algorithm trained to detect contact points between wheels of a vehicle and the ground. For an individual vehicle contact point (e.g., a left-front wheel or tire of the vehicle), a ray can be determined that originates from an endpoint (e.g., an origin) associated with the image sensor and passes through the object contact point. To determine a depth (e.g., distance) between the image sensor and the object contact point, the ray can be unprojected onto a three-dimensional surface mesh, and an intersection point between the ray and the three-dimensional surface mesh can be used as an initial estimate for the projected location of the object contact point. The projected location can be adjusted based on various cost functions to optimize an accuracy of the locations of the projected object contact points. With the object contact points projected onto the three-dimensional surface mesh, a three-dimensional bounding box can be determined that represents various observations about the vehicle. For example, the observations can include, but are not limited to, orientation, length, width, velocity, and the like. Accordingly, the three-dimensional bounding box representing the object in the environment can be provided to a prediction system or a planner system of the autonomous vehicle to generate a trajectory for the autonomous vehicle to navigate the environment.

The methods, apparatuses, and systems discussed herein can be used to determine a positions and/or orientation of a plurality of objects in an environment. For example, objects can include, but are not limited, vehicles with any number of wheels (e.g., one, two, three, four, eighteen, etc.) and are not limited to any particular type of vehicle. Examples of such objects include, but are not limited to, cars, trucks, vans, busses, bicycles, motorcycles, tricycles, unicycles, skateboards, pedestrians, and the like.

In some instances, the detection component can receive image data captured by an image sensor to detect an object represented in the image data. In some instances, the detection component can include a two-dimensional bounding box component, which can receive the image data and determine a two-dimensional bounding box that identifies the object. In some instances, the two-dimensional bounding box component can perform segmentation and/or classification to identify the object and/or to determine the two-dimensional bounding box.

In some instances, the image data including the two-dimensional bounding box associated with an object can be provided to the object contact point component to identify the object contact points in the image data. In an example where the object is a vehicle, the object contact points can represent a location of a wheel or tire of the vehicle intersecting with a ground or road surface. In some instances, the object contact point component can determine a location of the object contact point in the image data, as well as whether the object contact point corresponds to a particular wheel or tire (e.g., a left-front wheel, a right-front wheel, a left-rear wheel, a right-rear wheel, and the like). Further, the object contact point component can determine an uncertainty associated with a location of the individual object contact points in the image data. In some instances, the object contact point component can determine (e.g., estimate) an object contact point despite the wheel or tire being occluded by obstacles or the object itself. In some instances, the object contact point component can include an identifier associated with the object contact point indicating whether the object contact point is occluded or not.

A location of the autonomous vehicle capturing the image data can be determined with respect to a three-dimensional surface mesh or map of the environment. For example, the autonomous vehicle can utilize one or more light detection and ranging (LIDAR) sensors, RADAR sensors, GPS sensors, inertial measurement units (IMUs), etc., to localize the autonomous vehicle with respect to the three-dimensional surface or map. Further, since the location of the image sensor relative to the autonomous vehicle is known (or can be determined), a ray can be determined originating from an endpoint associated with the image sensor or autonomous vehicle and passing through an individual object contact point. Accordingly, based at least in part on a known location of the autonomous vehicle and a known location of the image sensor, a three-dimensional surface mesh component can be used to unproject a ray associated with an individual vehicle contact point onto the three-dimensional surface mesh to determine a projection location or intersection point associated with the ray. Each ray can be unprojected onto the three-dimensional surface mesh to determine a location of each object contact point on the three-dimensional surface. Because a location of the object contact points are known with respect to a three-dimensional surface, as the object moves over time (and accordingly, as various frames of object contact points are captured over time), various observations about the object such as orientation, length, width, velocity, etc. can be determined over time.

As used herein, the term "unproject," "unprojected," or "unprojecting" can refer to a conversion of two-dimensional data into three-dimensional data, while in some cases, the term "project," "projected," or "projecting" can refer to a conversion of three-dimensional data into two-dimensional data.

As mentioned above, individual object contact points can be associated with an uncertainty associated with an accuracy or confidence value associated with location of the object contact point in the image data. As the object contact points are unprojected onto the three-dimensional surface, the uncertainty can be unprojected as well. That is, a first uncertainty can be associated with an uncertainty of the object contact point in the image data, while a second uncertainty can be associated with an uncertainty of the object contact point on the three-dimensional surface mesh. Further, the second uncertainty can be based at least in part on the first uncertainty. In some instances, the second uncertainties and/or location can be determined from the first uncertainties based at least in part on an unscented transform.

Accordingly, the various object contact points can include individual uncertainties of the respective object contact points with respect to the three-dimensional surface mesh. In some instances, various cost functions can be used to optimize a location of the object contact points on the three-dimensional surface, with the various uncertainties informing the cost functions how to adjust the various contact points. In some instances, the various cost functions can include a ray casting cost component, a mesh normal cost component, a reprojection cost component, and a dynamics cost component.

In some instances, the ray casting cost component can include functionality to determine a cost or error associated with unprojecting the ray onto the three-dimensional surface mesh. For example, each object contact point can be associated with an uncertainty. The ray casting cost component can determine, in general, a measure of how close the estimated location of the object contact point with respect to the three-dimensional surface mesh is to the unprojected location of the ray onto the three-dimensional surface mesh.

In some instances, the mesh normal cost component can include functionality to determine a cost or error associated with differences between a normal vector associated with a three-dimensional bounding box associated with the vehicle and a normal vector associated with a surface on which the vehicle is located. This constraint ensures that the predicted object lies flat on the surface on which it is sitting. For example, the mesh normal cost component can determine a first plane associated with the projected object contact points (e.g., by performing a cross product of vectors connecting contact points, by using a vector associated with a height of the bounding box, etc.), and can determine a first normal vector associated with that first plane (e.g., by cross-products of nearest neighbor points on the plane, etc.). Further, the mesh normal cost component can determine a second plane associated with points associated with the three-dimensional surface mesh, and can determine a second normal vector associated with the second plane. The mesh normal component can determine a difference (e.g., a dot product, or other measure of difference) between the first normal vector and the second normal vector to determine if the object orientation is consistent with an orientation of the three-dimensional surface mesh (e.g., the ground).

In some instances, the reprojection cost component can include functionality to project estimated locations of the projected object contact points (e.g., after adjustments, optimization, or manipulations) into the image data to determine whether the estimated locations of the object contact points with respect to the three-dimensional surface mesh are with threshold distances or values of the initial locations of the object contact points represented in the image data. This constraint ensures that locations of the contact points in the mesh are consistent with the two-dimensional contact points in the image.

In some instances, the dynamics cost component can include functionality to evaluate a location of the object contact points over time to determine a velocity of the object. For example, the dynamics cost component can utilize a sliding window of N frames (where N is an integer) to evaluate motion of the object and to determine whether the locations of the object contact points are consistent with such motion over time.

Accordingly, the projected locations of the object contact points can be optimized using a variety of cost functions and over a sliding window to provide a robust determination of object observations. In some instances, the object observations can include 14 degrees of freedom (DOF), representing 6 DOF associated with the object location, 6 DOF associated with the object motion, and 2 DOF associated with the object width and length. In such instances, a height of the bounding box may be ignored, as it may not impact how the autonomous vehicle traverses the environment. In other words, the autonomous vehicle's driving is independent of the height of objects in an environment. In some instances, the object observations can include 8 degrees of freedom (e.g., 6 DOF representing the object location and orientation (pose) and 2 DOF representing the extents (e.g., length and width) of the bounding box). In some instances, the object observations can include 15 degrees of freedom (e.g., similar to the 14 DOF discussed above, with an additional height observation associated with the bounding box). Accordingly, the object observations can be represented as a three-dimensional bounding box with associated information that can be provided to other computer vision systems or components of an autonomous vehicle for subsequent processing, including but not limited to segmentation, classification, prediction, trajectory generation for an autonomous vehicle, and the like.

The object orientation determination techniques described herein can improve a functioning of a computing device by providing a robust mechanism for determining object data in an environment using image data. For example, in some instances, the techniques used herein can provide robust object data outside the range of traditional sensors such as LIDAR or RADAR. Further, the techniques can be robust with respect to occlusions of the image data, such that partially occluded representations of objects can be used to determine object orientations, motion, extents, and the like. Further, the use of object contact points provides a robust model that may function on a variety of objects, and may not rely on determining particular makes or models of vehicles for determining sizes and/or distances from the autonomous vehicle. Further, the three-dimensional bounding boxes of objects in an environment can allow various systems of an autonomous vehicle performing segmentation, classification, route planning, trajectory generation, and the like to be performed more accurately, may require less processing power, and/or may require less memory. For example, more accurate object information may be utilized in generating a trajectory of an autonomous vehicle, which may improve safety for occupants of an autonomous vehicle. These and other improvements to the functioning of the computer are discussed herein.

In some instances, the techniques discussed herein can be implemented in a system including image sensor(s) (e.g., RGB cameras), depth cameras (e.g., RGB-D cameras (e.g., time-of-flight cameras)), LIDAR sensors, RADAR sensors, SONAR sensors, and the like, to provide redundancy to the system in the event of hardware or software failure. For example, in the event that a depth camera is occluded or broken, the techniques discussed herein can be used with an image sensor to provide redundancy and/or backup to ensure that dense depth information can be available under many circumstances. Thus, the techniques discussed herein provide additional improvements to machine vision systems, for example.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems using machine vision, and is not limited to autonomous vehicles. Further, although described in connection with a determining a position with respect to a three-dimensional surface mesh, any three-dimensional surface or two-dimensional surface can be used to estimate distances or positions. In another example, the methods, apparatuses, and systems may be utilized in a manufacturing assembly line context, or in an aerial surveying context. Further, the datasets may include data from stereoscopic cameras, depth cameras, LIDAR sensors, RADAR sensors, acoustic sensors, etc., and may include any number of layers or channels, which may correspond to any number of dimensions. Additionally, the techniques described herein may be used with real data (e.g., captured using sensor(s)), simulated data (e.g., generated by a simulator), or any combination of the two.

FIG. 1 illustrates a pictorial flow diagram 100 of an example process for determining a three-dimensional bounding box associated with an object orientation based on image data and object contact points, in accordance with embodiments of the disclosure.

At operation 102, the process can include receiving image data including a representation of an object, such as a vehicle. In some instances, the operation 102 can include capturing, by at least one image sensor associated with an autonomous vehicle, the image data received in the operation 102. In some instances, the operation 102 can include capturing image data by a plurality of image sensors and fusing the image data. As illustrated in an example 104, image data 106 can include a representation of vehicles 108 and 110. Of course, the operation 102 can be performed by any system utilizing machine vision, and is not limited to the context of autonomous vehicles.

At operation 112, the process can include determining object contact point(s) of objects (e.g., the vehicles 108 and 110) represented in the image data 106. In some instances, the operation 112 can include determining a two-dimensional bounding box associated with a particular object to identify the vehicles 108 and 110 in the image data. In an example 114, a two-dimensional (2-D) bounding box 116 is shown identifying boundaries of the vehicle 108 in the image data 106.

The object contact point(s) determined in the operation 112 are illustrated as vehicle contact points 118, 120, 122, and 124. In particular, the right-rear vehicle contact point 118 illustrates a contact point between the right-rear wheel or tire of the vehicle 108 and a surface of the road in the image data 106. The left-rear vehicle contact point 120 illustrates a contact point between the left-rear wheel or tire of the vehicle 108 and a surface of the road in the image data 106. The right-front vehicle contact point 122 illustrates a contact point between the right-front wheel or tire of the vehicle 108 and a surface of the road in the image data 106. And the left-front vehicle contact point 124 illustrates a contact point between the left-front wheel or tire of the vehicle 108 and a surface of the road in the image data 106.

As illustrated, the left-rear vehicle contact point 120 may be occluded by other aspects of the vehicle 108. Nevertheless, the operation 112 can include determining object contact points for wheels or tires that are occluded in the image data 106. In some instances, the operation 112 can include determining an identifier or flag associated with each object contact point indicating whether the object contact point is occluded or not. Further, the operation 112 can include determining an uncertainty associated with the object contact point. In some instances, the uncertainty can represent a probability distribution of the various positions that the vehicle contact points 118, 120, 122, and 124 can represent. In some instances, an amount or degree of uncertainty can be represented visually as a size of circle or oval surrounding the vehicle contact points 118, 120, 122, and 124, respectively.

In some instances, the operation 112 can be performed by a machine learning algorithm that has been trained to detect vehicle contact points in image data. For example, the operation 112 can be performed, at least in part, by a neural network trained to receive image data (with or without the two-dimensional bounding box 116 identifying the vehicle 108) and return the vehicle contact points 118, 120, 122, and 124.

At operation 126, the process can include determining a distance between an image capture device and each of the one or more object contact point(s) of the object. In an example 128, an image sensor 130 is illustrated as having captured the image data 106 used to determine the vehicle contact points 118, 120, 122, and 124. Further, rays 132 are illustrated as emanating from the image sensor 130 and traversing through individual ones of the vehicle contact points 118, 120, 122, and 124. The rays 132 associated with the vehicle contact points 118, 120, 122, and 124 may not be associated with a depth or distance information (e.g., may be visualized as an infinite vector originating at the sensor origin and passing through each of the object contact points).

In general, the operation 126 can include determining a ray of the rays 132 and unprojecting the ray onto a three-dimensional surface or map. As noted above, an unprojection can refer to a transformation from a two-dimensional frame of reference into a three-dimensional frame of reference, while a projection can refer to a transformation from a three-dimensional frame of reference to into a two-dimensional frame of reference. In some instances, the operation 126 can include determining a location of the image sensor relative to the three-dimensional surface and unprojecting the ray onto the three-dimensional surface based at least in part on the geometry of the ray, intrinsic and extrinsic information associated with the image sensor 130 (e.g., focal length, center, lens parameters, height, direction, tilt, etc.), and the known location of the image sensor 130. In some instances, the ray can be unprojected onto the three-dimensional surface, and the distances between the image capture device and the various object contact points unprojected onto the three-dimensional surface can be determined. In some instances, the three-dimensional surface mesh can correspond to a detailed map representing an environment that has been generated or built up over time using measurements from one or more sensors (LIDAR, camera, depth, etc.) or other mapping software and/or hardware.

In some instances, the operation 126 can include determining a distance between the image capture device and the object based at least in part on data from one or more LIDAR sensors, RADAR sensors, GPS sensors, stereoscopic cameras, one or more depth cameras (e.g., time of flight sensors), and the like. Further, in some instances, the operation 126 can include determining a ray of the rays 132 and projecting the ray onto a two-dimensional surface that provides a simplified representation of the surface of the ground.

Additional details for determining the distance between the image capture device and the object based at least in part on the object contact point(s), and additional details for unprojecting the object contact points onto a three-dimensional surface mesh, are provided below in connection with FIGS. 3A and 3B, and throughout this disclosure.

At operation 134, the process can include determining a three-dimensional (3-D) bounding box and information (e.g., position, velocity, width, length, etc.) associated with the object based at least in part on the object contact point(s) and the distance. In an example 136, a three-dimensional (3-D) bounding box 138 is illustrated as being associated with the vehicle 108. In some instances, aspects of the operation 102, 112, and 126 can be repeated or performed continuously to determine updated object contact point(s) over time. Further the operation 134 can include aggregating the object contact point(s) over time or performing processing on a sliding window of N frames to determine a velocity of the vehicle 108 over time. For example, the operation 134 can include determining a velocity of the vehicle 108 by determining a distance that the vehicle 108 has moved from a position at a first time to a position at a second time. In some instances, the operation 134 can include determining a velocity of the vehicle 108 based at least in part on a physics-based model. For example, the physics-based mode can include, but is not limited to, a rigid body dynamics model, a vehicle model based on actual vehicle characteristics (e.g., friction, acceleration, length/width, etc.), and/or a simplified model whereby a vehicle is represented as a "bicycle" (e.g., a vehicle with four wheels is simplified as a motorcycle or bicycle).

Further, the operation 134 can include adjusting locations of the various object contact points unprojected onto the three-dimensional surface based at least in part on an uncertainty associated with the various object contact points, and based at least in part on various cost functions. In some instances, and as discussed in more detail herein, the various cost functions can be evaluated simultaneously or substantially simultaneously within a sliding window to optimize a position of the object contact points with respect to the various costs or errors.

In some instances, the operation 134 can include providing the three-dimensional bounding box to other systems of an autonomous vehicle, such as a prediction system and/or a planning system to determine or generate a trajectory for the autonomous vehicle based at least in part on the three-dimensional bounding box 138. For example, the operation 134 can include generating a trajectory for an autonomous vehicle so that the autonomous vehicle does not collide with the object represented by the three-dimensional bounding box 138.

Figure 2:
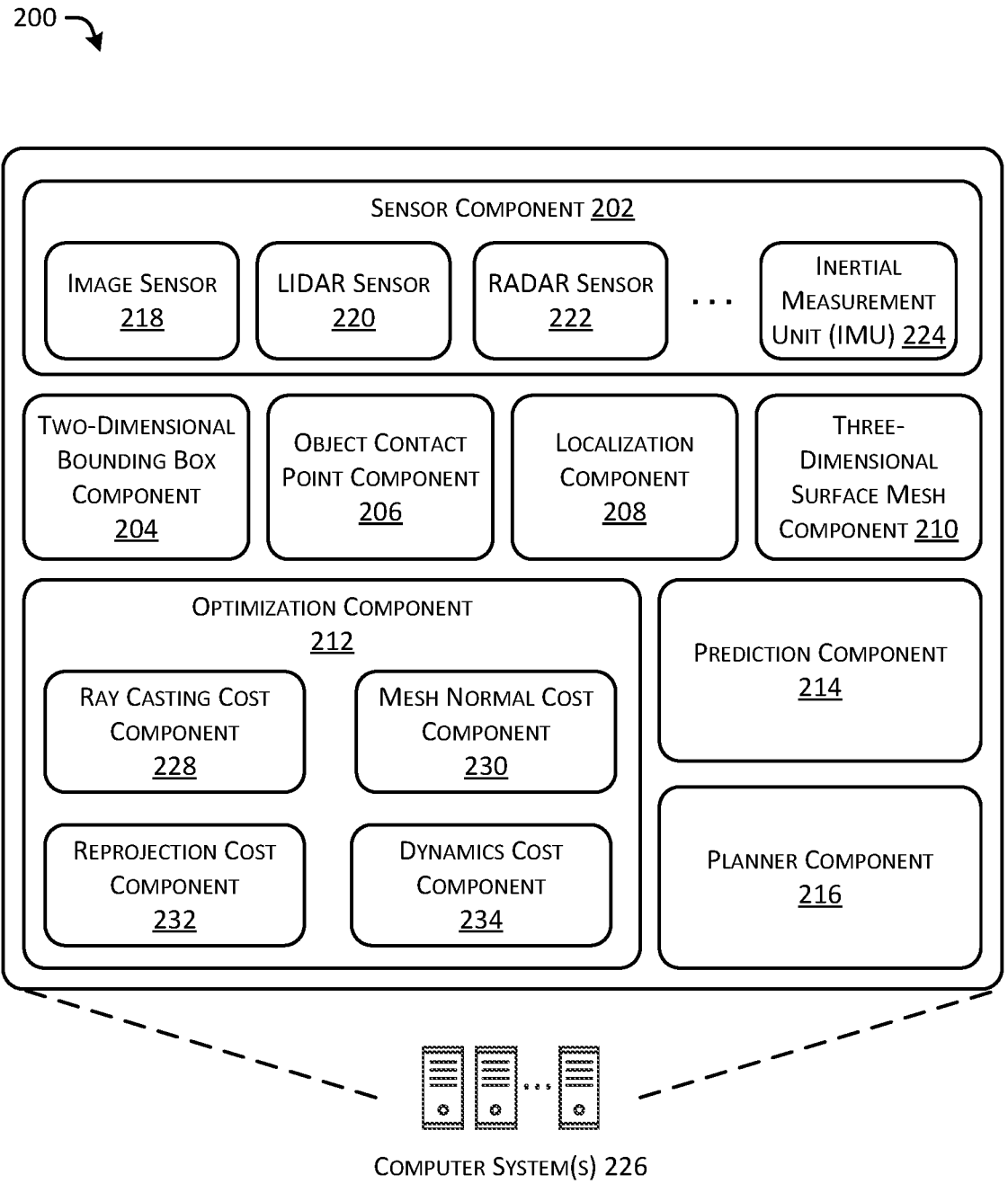
FIG. 2 illustrates an example architecture for implementing the techniques for determining an object orientation based on image data and object contact points.

FIG. 2 illustrates an example architecture 200 for implementing the techniques for determining an object orientation based on image data and object contact points. For example, the architecture 200 can include a sensor component 202, a two-dimensional bounding box component 204, an object contact point component 206, a localization component 208, a three-dimensional surface mesh component 210, an optimization component 212, a prediction component 214, and a planner component 216.

Further, the sensor component 202 can include any number of sensors, including but not limited to an image sensor 218, a LIDAR sensor 220, a RADAR sensor 222, an inertial measurement unit (IMU) 224, and the like.

In some instances, the image sensor 218 can include any color cameras (e.g., RGB), monochrome cameras, infrared (IR) cameras, depth-cameras (e.g., time of flight cameras), ultraviolet (UV) cameras, stereoscopic cameras, etc. In some instances, the image sensor(s) 218 can be located at various points of an autonomous vehicle, such as the corners of a vehicle, to capture various portions of an environment. In some instances, the image sensor(s) 218 can be associated with extrinsic characteristics indicating a location of the particular image sensor with respect to the vehicle, height, field of view, tilt angle, resolution, and the like. Accordingly, the three-dimensional surface mesh component 210, discussed below, can determine a ray associated with image data captured by the image sensor 218 and a point in the associated image data, such as an object contact point, as discussed herein.

In some instances, the LIDAR sensor 220 can include one or more LIDAR sensors to capture depth data of an environment. In some instances, the LIDAR sensor 220 and/or the image sensor(s) 218 can operate in conjunction with the localization component 208 to determine a location of an autonomous vehicle, for example, when the architecture 200 is implemented as an autonomous vehicle. In some instances, the LIDAR sensor 220 can include any number of LIDAR sensors located to capture various portions of an environment. Further, the LIDAR sensor 220 can be used to determine static and/or dynamic objects based on motion of the objects in the environment.

In some instances, the RADAR sensor 222 can include one or more RADAR sensors to capture depth information associated with an environment. In some instances, the RADAR sensor 222 can operate in conjunction with the localization component 208 to determine a location of an autonomous vehicle, for example, when the architecture 200 is implemented as an autonomous vehicle. In some instances, the RADAR sensor 222 can include any number of RADAR sensors located to capture various portions of an environment. Further, the RADAR sensor 222 can be used to determine static and/or dynamic objects based on motion of the objects in the environment.

In some instances, the inertial measurement unit(s) (IMU) 224 can determine motion of computer system(s) 226, especially when implemented as an autonomous vehicle. For example, the IMU 224 can operate in conjunction with the localization component 208 to determine a location of the autonomous vehicle.

In some instances, the sensor component 202 can include any number of additional sensors, including but not limited to sonar sensors, ultrasonic transducers, wheel encoders, microphones, accelerometers, gyroscopes, magnetometers, temperature sensors, humidity sensors, light sensors, global positioning system (GPS) sensors, and the like.

The two-dimensional bounding box component 204 can include functionality to receive image data captured by the image sensor(s) 218, for example, and to perform segmentation and/or classification on the image data to identify an object (such as a vehicle) represented in the image data, and to determine a two-dimensional bounding box associated with the vehicle. In some instances, and as discussed in more detail below, the two-dimensional bounding box component 204 can be implemented as a machine learning algorithm trained to identify objects in image data, and to determine a bounding box associated with the object. In some instances, a two-dimensional bounding box generated by the two-dimensional bounding box component 204 may capture a region of the image data including some or all pixels associated with an object.

The object contact point component 206 can include functionality to receive the image data and/or the two-dimensional bounding box associated with a representation of an object to determine one or more object contact points represented in the data. For example, the object contact point component 206 can receive image data of an object, such as a vehicle including four wheels, and can determine locations in the image data corresponding to where the four wheels contact a ground surface, for example. Further, the object contact point component 206 can determine whether an object contact point is occluded and can nevertheless return an object contact point. In some instances, the object contact point component 206 can determine an uncertainty associated with a location or accuracy for each individual object contact point.

In some instances, the object contact point component 206 can include functionality to provide an interface to receive annotation information to generate training data to train a machine learning algorithm. For example, such a training interface can present a user with an image of a vehicle (e.g., determined by the two-dimensional bounding box component) and can receive user input to label individual object contact points, to identify a corresponding location of the object (e.g., left-front wheel, right-front wheel, left-rear wheel, right-rear wheel, and the like), and to identify whether the object contact point is occluded (e.g., not visible). In some instances, such labeled training image data can be used as ground truth to train a machine learning algorithm, such as a neural network. Accordingly, a trained machine learning algorithm can be implemented on an autonomous vehicle for operation in an environment.

The localization component 208 can include functionality to receive data from the sensor component 202 to determine a position of the computer systems 226 implemented as an autonomous vehicle. For example, the localization component 208 can include a three-dimensional map of an environment and can continuously determine a location of the autonomous vehicle within the map. In some instances, the localization component 208 can utilize SLAM (simultaneous localization and mapping) or CLAMS (calibration, localization and mapping, simultaneously) to receive image data, LIDAR data, RADAR data, IMU data, GPS data, and the like to accurately determine a location of the autonomous vehicle.

The three-dimensional surface mesh component 210 can include functionality to determine individual rays associated with the object contact point(s) and to unproject the individual rays onto a three-dimensional surface mesh. For example, an individual ray can be defined as originating from an endpoint associated with the image sensor 218, for example an image sensor origin, and extending through individual object contact points in the image plane. In some instances, the distance between the image sensor and the object contact points is not readily determined from the image data, as the image data may not include depth data. Thus, in order to determine depth information, the ray can be unprojected from the image sensor onto the three-dimensional surface mesh to determine an intersection point between the ray and the three-dimensional surface mesh component. Further, because the three-dimensional surface mesh can be a pre-built data structure accurately representing the environment in which the autonomous vehicle is operating, the intersection point of the ray can indicate a location of the object in the environment, thereby providing depth information to the computer system 226.

In some instances, the three-dimensional surface mesh component 210 can project the object contact points onto the three-dimensional surface mesh and constrain the object contact points to remain in a rectangle or other shape when manipulated to determine an optimal location of the vehicle contact points representing the vehicle on the three-dimensional surface mesh. In some instances, the computer system 226 can determine a shape of the bounding box as a cost that can be optimized, for example, giving preference to bounding boxes with a substantially rectangular shape but allowing some minor deviation from a true rectangle (e.g. solving for corners such that sides are parallel and have equal or similar lengths). In some instances, the computer system 226 may ensure that the result of optimization is a rectangular prism by requiring output of a center and extents, as described above.

As mentioned above, in some instances, individual object contact points can be associated with an uncertainty. In some instances, the uncertainty can be projected onto the three-dimensional surface and/or associated with the projected locations of the individual object contact points, such as by using an unscented transform. Accordingly, adjustments, manipulations, refinements, or updates to the positions of the projected object contact points can be based at least in part on the uncertainty associated with the various points as determined by the two-dimensional bounding box component 204. For example, for an object contact point associated with a low uncertainty, the three-dimensional surface mesh component 210 may locate an unprojected location of the corresponding object contact point close to the initial estimate, when updating the unprojected location to a final estimated location with respect to the three-dimensional surface mesh. In another example, for an object contact point associated with a high uncertainty, the three-dimensional surface mesh component 210 may locate an unprojected location of the corresponding object contact point relatively farther from the initial estimate, when updating the unprojected location to a final estimated location on the three-dimensional surface mesh.

In some instances, the three-dimensional surface mesh component 210 can unproject the rays onto a flat surface or an approximation of the environment. That is, in some instances, the three-dimensional surface mesh component can utilize a simplified model of a surface depending on an amount of information available, a level of accuracy required or desired, and the like. In some instances, the three-dimensional surface mesh component 210 can utilize depth data such as LIDAR data and/or RADAR data to confirm a depth estimate or to verify an accuracy of the model, for example.

In some instances, the optimization component 212 can further include a ray casting cost component 228, a mesh normal cost component 230, a reprojection cost component 232, and a dynamics cost component 234. In general, the optimization component 212 can iteratively, simultaneously, or continuously evaluate costs or errors associated with unprojected locations of the object contact points to accurately determine a location of a three-dimensional bounding box representing an object in an environment.

In general, in some instances, the ray casting cost component 228 can include functionality to determine, verify, evaluate, or enforce that that the locations of the final estimated projected locations on the three-dimensional surface mesh are close to the initial projection of the ray representing an object contact point onto the three-dimensional surface mesh.

In general, in some instances, the mesh normal cost component 230 can include functionality to determine a plane associated with the final estimated unprojected locations of the object contact points, and can determine a first normal vector associated with that plane (e.g., by normalizing a cross-product of two vectors connecting object contact points, taking a sampling of points in the plane, etc.). Further, the mesh normal cost component 230 can determine a plane "underneath" the final estimated unprojected locations of the object contact points, and can determine a second normal vector associated with that plane. The mesh normal cost component 230 can evaluate the first normal vector and the second normal vector to determine that an error associated with the normal vectors is above a threshold value, such as, for example, evaluating a dot product of the two normal vectors. In other words, the mesh normal cost component 230 can ensure that a pitch of the object is similar to the pitch of a local surface normal of the three-dimensional surface mesh. Further, as used herein, the term "final" is not intended to correspond to an absolutely final position, and is intended to correspond to an estimate or a location based on optimization or reductions in costs or errors, as discussed herein.

In general, in some instances, the reprojection cost component 232 can include functionality to determine whether the final estimated unprojected locations of the object contact points are consistent with the object contact points in the image data. In some cases, the reprojection cost component 232 can ensure that the three-dimensional point estimates are consistent with observed image-plane measurements. For example, estimated contact points in the mesh can be projected back into the image plane. In such an example, the reprojection cost may be the sum of Euclidian differences in pixel coordinates between the originally detected contact points and the reprojected contact points.

In general, in some instances, the dynamics cost component 234 can include functionality to determine motion of the object based on the object contact points. In other words, such a cost ensures that motion of the detected object is constrained to physically consistent motion. For example, for a given estimated position at a first time, and for a given estimated velocity at a first time, the dynamics cost component 234 can predict a position of the object at a second time and compare that predicted position of the object with a measured or estimated position of the object. As discussed herein, in some instances, the optimization component 212 can include a sliding window incorporating N-frames, so that position and velocity can be determined and costs can be validated over a sliding window to improve accuracy and performance of the system. In some instances, the dynamics costs component 234 can reject estimated positions at particular times if the positions are not consistent with an observed or estimated velocity, and in some instances, the dynamics cost component 234 can reject estimated velocities at particular times if the velocities are not consistent with an observed or estimated position of the object at a particular time.

The prediction component 214 can include functionality to receive three-dimensional bounding box information associated with the object to determine a predicted velocity and/or position of the object. In some instances, the prediction component 214 can include functionality to access symbols and/or temporal logic to determine reasonable options available to the object to determine a likelihood that the object may perform one or more particular actions in the future. In some instances, the prediction component 214 can operate in conjunction with the planner component 216, discussed below, to generate one or more trajectories for an autonomous vehicle to navigate an environment.

The planner component 216 can include functionality to receive one or more three-dimensional bounding boxes associated with one or more objects and to generate a trajectory for an autonomous vehicle. In some instances, the planner component 216 can interface with one or more controllers to control steering, propulsion, braking, safety, emitters, communication, and other systems of the autonomous vehicle.

In some instances, aspects of some or all of the components discussed herein may include any models, algorithms, and/or machine learning algorithms. For example, in some instances, the two-dimensional bounding box component 204, the object contact point component 206, the three-dimensional surface mesh component 210, and the optimization component 212 may be implemented as a neural network.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, and the like.

Figure 3A:
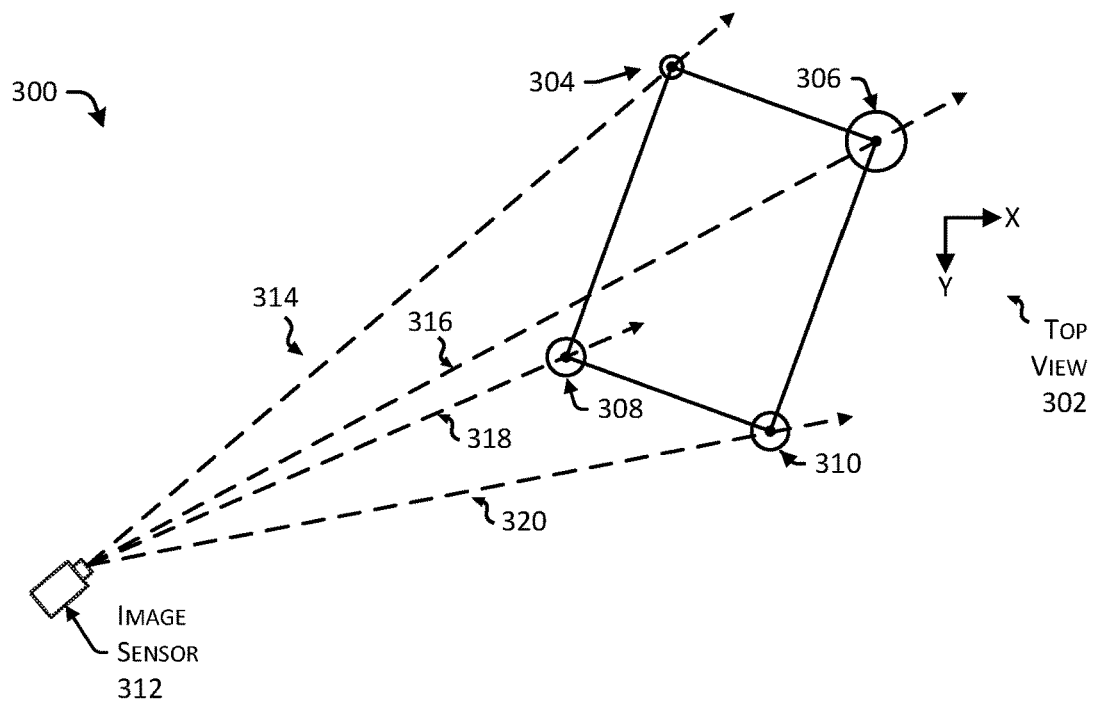
FIG. 3A depicts an example top view of determining rays associated with object contact points for unprojecting the rays onto a three-dimensional surface mesh, in accordance with embodiments of the disclosure.

FIG. 3A depicts an example 300 of a top view 302 of determining rays associated with object contact points for unprojecting the rays onto a three-dimensional surface mesh, in accordance with embodiments of the disclosure. In general, the top view 302 illustrates a plurality of object contact points 304, 306, 308, and 310 representing outputs of an algorithm such as a neural network trained to determine the object contact points, as discussed herein. As discussed above, each of the contact points can have an associated uncertainty (represented as an ellipse, or ellipsoid in three dimensions, surrounding the interior marker). In some instances, a degree of uncertainty can be represented by a size of the ellipse surrounding the object contact point.

The top view 302 further illustrates an image sensor 312 for capturing image data, as discussed herein. Further, the top view 302 illustrates rays 314, 316, 318, and 320. As can be understood, the ray 314 is illustrated as originating with the image sensor 312 as an endpoint, and passing through the object contact point 304. Further, the ray 316 is illustrated with the image sensor 312 as an endpoint, and passing through the object contact point 306. Next, the ray 318 is illustrated as originating with the image sensor 312 as an endpoint, and passing through the object contact point 308. And the ray 320 is illustrated as originating with the image sensor 312 as an endpoint, and passing through the object contact point 310. In some instances, the rays 314, 316, 318, and 320 may not be associated with a distance prior to being unprojected onto the three-dimensional surface mesh, as discussed herein. That is, in some instances, the rays 314, 216, 318 and 320 are indicative of an origin and direction.

In some instances, the rays 314, 316, 318, and 320 can be determined based at least in part on intrinsic and/or extrinsic information associated with the image sensor (e.g., focal length in various dimensions, center, lens parameters, position in the environment, height, direction, resolution, tilt, channels, etc.) and/or a location of the object contact point within captured image data.

Figure 3B:
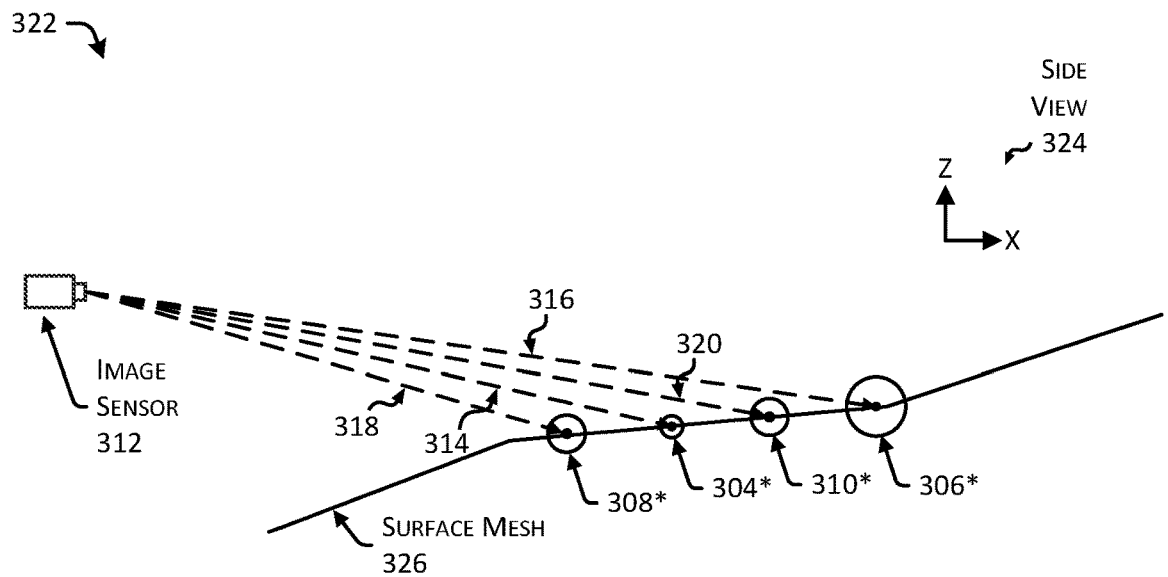
FIG. 3B depicts an example side view of determining rays associated with object contact points for unprojecting the rays onto a three-dimensional surface mesh, in accordance with embodiments of the disclosure.

FIG. 3B depicts an example 322 side view 324 of determining rays associated with object contact points for unprojecting the rays onto a three-dimensional surface mesh 326, in accordance with embodiments of the disclosure. For example, after determining a ray based at least in part on a location of a respective object contact point in image data, the ray can be unprojected onto the surface mesh 326 to determine an intersection with the surface mesh. Because a distance between the projected locations of the object contact points 304*, 306*, 308*, and 310* can be determined based at least in part by the known distances associated with the surface mesh 326, the distances, length, width, orientation, velocity, and the like of an object represented by the unprojected locations of the object contact points can be determined based at least in part on the object contact points and/or by the unprojected locations of the object contact points with respect to the surface mesh 326.

FIGS. 1 and 4-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
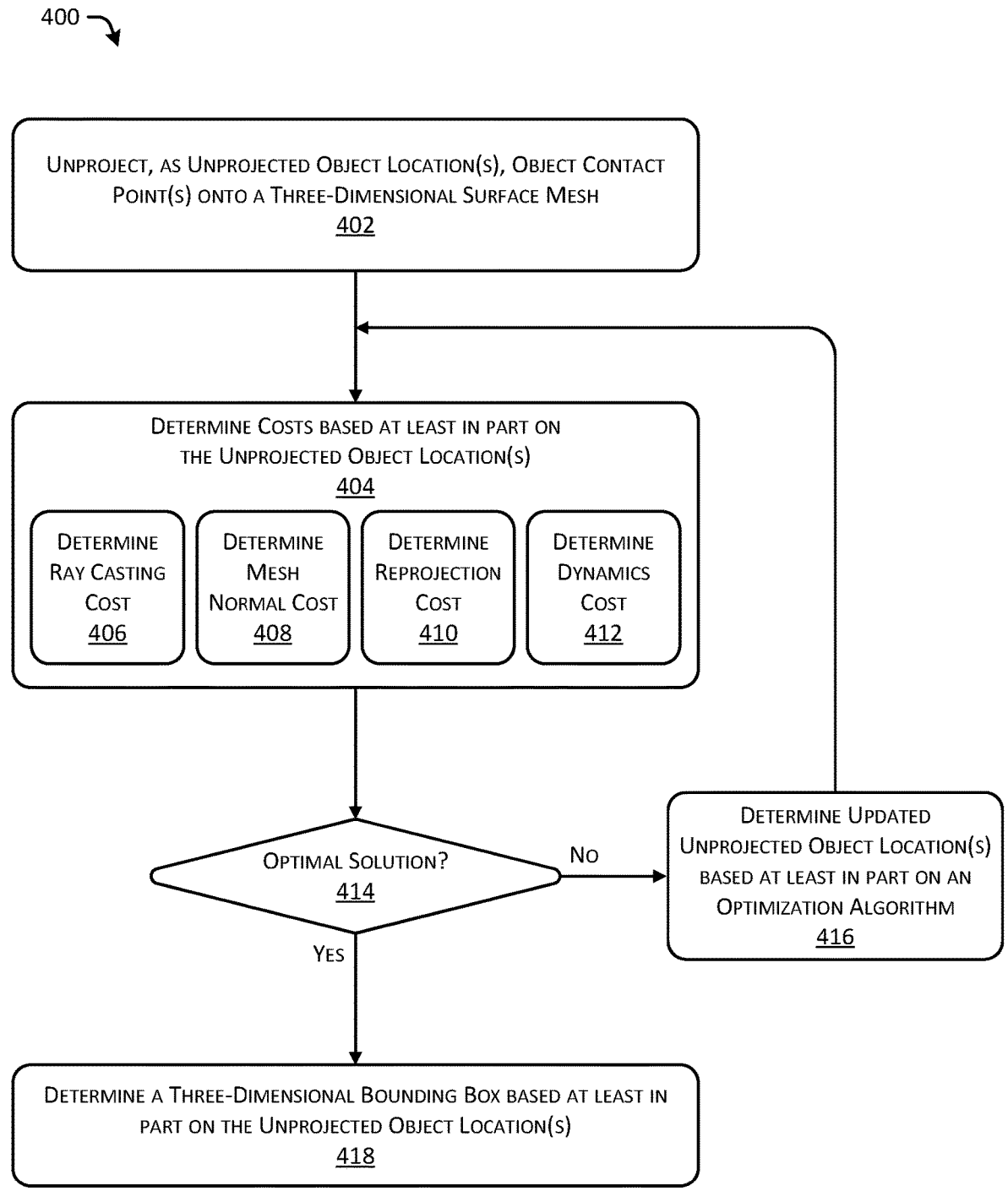
FIG. 4 depicts an example process of determining a three-dimensional bounding box based at least in part on optimizing one or more locations of a projected object location based on a plurality of cost functions, as discussed herein.

FIG. 4 depicts an example process 400 of determining a three-dimensional bounding box based at least in part on optimizing one or more locations of an unprojected object location based on a plurality of cost functions, as discussed herein. For example, some or all of the process 400 can be performed by one or more components in the FIG. 2 or 9, as described herein.

At operation 402, the process can include unprojecting, as unprojected object location(s), object contact points onto a three-dimensional surface mesh. For example, the operation 402 can include transforming object contact point(s) from a two-dimensional reference frame into a three-dimensional reference frame. In some instances, the operation 402 can include unprojecting an uncertainty onto the three-dimensional surface mesh based at least in part on an unscented transform.

At operation 404, the process can include determining costs based at least in part on the unprojected object location (s). For example, the operation 404 can include determining a variety of costs associated with an unprojected object location in parallel, and determining a sum of the costs estimated in parallel. Individual costs can include a ray casting cost, a mesh normal cost, a reprojection cost, and a dynamics cost. For example, at operation 406, the process can include determining a ray casting cost. Additional details of this operation are provided in connection with FIG. 5. At operation 408, the process can include determining a mesh normal cost. Additional details of this operation are provided in connection with FIG. 6. At operation 410, the process can include determining a reprojection cost. Additional details of this operation are provided in connection with FIG. 7. At operation 412, the process can include determining a dynamics cost. Additional details of this operation are provided in connection with FIG. 8. After the costs are determined in the operations 406, 408, 410, and 412, the costs can be calculated as the sum of all costs.

At operation 414, the process can include determining if the summed costs is below a threshold value, if a change between iterations is below a threshold value, and the like. Additionally, the operation 414 can determine if a number of iterations is above a threshold value and/or if an amount of processing time is above a threshold value (e.g., to guarantee a solution within a period of time). If the costs are not an optimal solution (e.g., "No" in the operation 414), the process continues to operation 416.

At operation 416, the process includes determining at least one updated unprojected object location(s) based at least in part on an optimization algorithm, such as, for example, a non-linear least squares optimization. In some instances, for example in the context of determining object contact points for a vehicle including four wheels, the object points can be adjusted with a rectangular constraint, such that the points are adjusted while remaining in a rectangular shape with respect to the other points. In some instances, the operation 416 is based at least in part on a gradient descent to determine a local or global optimal solution (e.g., to minimize the summed costs). After determining updated unprojected object location(s), the process returns to the operation 404 to determine updated costs based on the updated unprojected object location(s).

At operation 414, upon determining that the unprojected object location(s) (or the updated unprojected object location(s)) are an optimal solution (e.g., "Yes" in operation 414), the process continues to operation 418.

At operation 418, the process includes determining a three-dimensional bounding box based at least in part on the unprojected object location(s). In some instances, the locations of the corners of the bounding box can be based at least in part on the unprojected object location(s) while the height can be determined based on the image data (e.g., based on a machine learning algorithm) or can be based on a fixed value.

Figure 5:
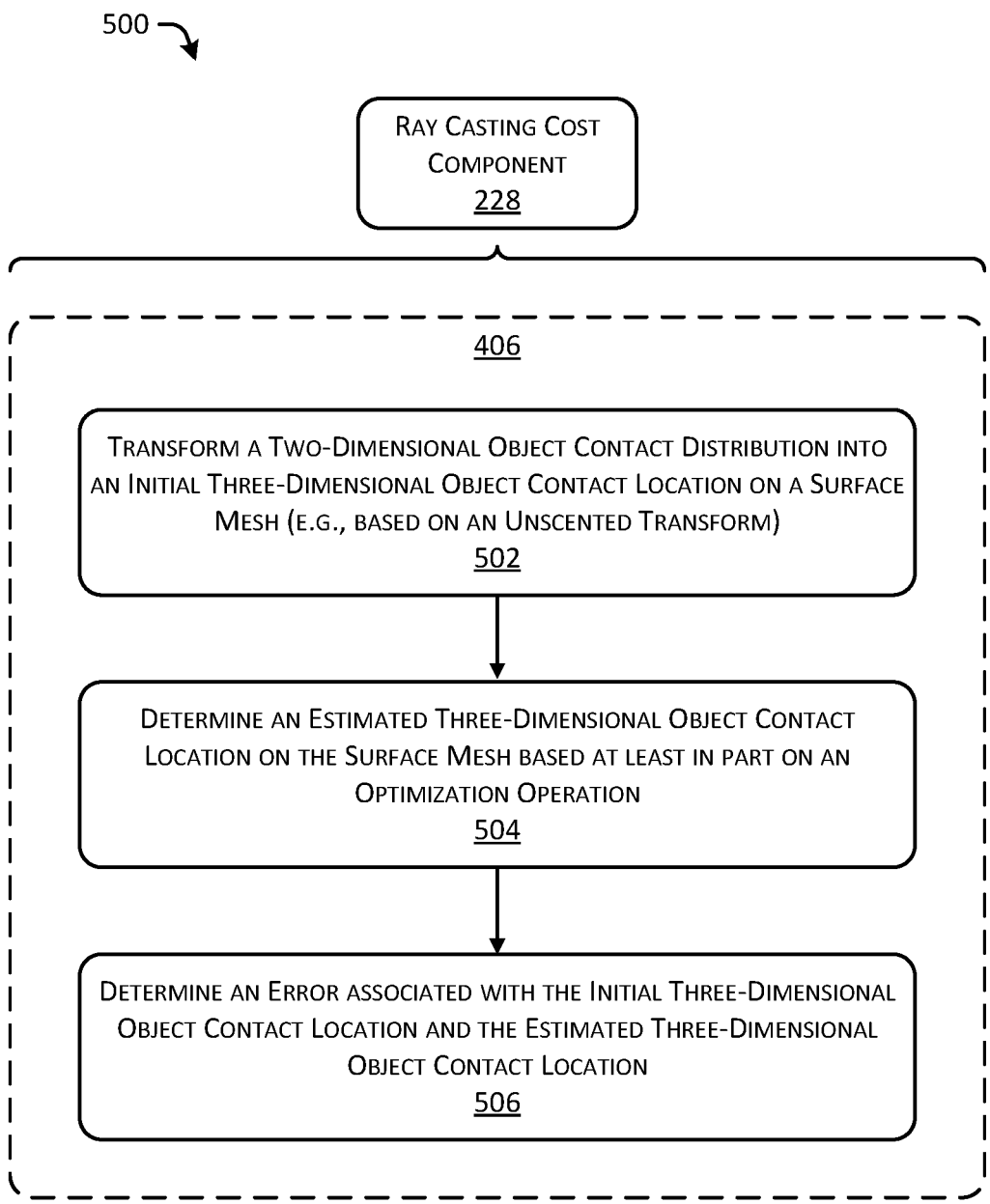
FIG. 5 depicts an example process for determining a ray casting cost for determining an object orientation based on image data and object contact points, as discussed herein.

FIG. 5 depicts an example process 500 for determining a ray casting cost for determining a vehicle orientation based on image data and vehicle contact points, as discussed herein. For example, some or all of the process 500 can be performed by one or more components in the FIG. 2 or 9, as described herein. For example, some or all of the process 500 can be performed by the ray casting cost component 228.

At operation 502, the process can include transforming a two-dimensional (2-D) object contact distribution into an initial three-dimensional object contact location with respect to a surface mesh. In some examples, the operation 502 can be based at least in part on an unscented transform. For example, in some instances, the unscented transform can first compute a set of sigma points based at least in part on the two-dimensional object contact distribution and/or based at least in part on the two-dimensional bounding box. Second, each sigma point can be mapped (e.g., ray-casted) to the three-dimensional surface mesh. Third, for the points mapped to the three-dimensional surface mesh, the operation 502 can include determining a mean and/or covariance of the points to determine the three-dimensional object contact location with respect to the surface mesh.

At operation 504, the process can include determining an estimated three-dimensional object contact location with respect to the surface mesh based at least in part on an optimization operation. For example, a set of three-dimensional object contact locations (e.g., representing four wheels of a vehicle) can be manipulated or adjusted in combination to determine optimal locations to minimize a global cost associated with the estimated locations.

At operation 506, the process can include determining an error associated with the initial three-dimensional object contact location and the estimated three-dimensional object contact location. In some instances, the ray casting cost component can be performed as data is accumulated and as various estimated positions are updated to search for a local and/or global optimum position to minimize costs and/or error associated with the three-dimensional object contact locations (e.g., the object contact points). As noted above, in some instances, the error (e.g., cost) can be based at least in part on the sum of a covariance-weighted distance of each estimated three-dimensional object contact location from the initial three-dimensional object contact location (e.g., representing a mean of the covariance matrix of the distribution). In some instances, cost is based at least in part on an unscented transform. In some instances, the cost is based at least in part on a covariance weighted least-squares error algorithm.

Figure 6:
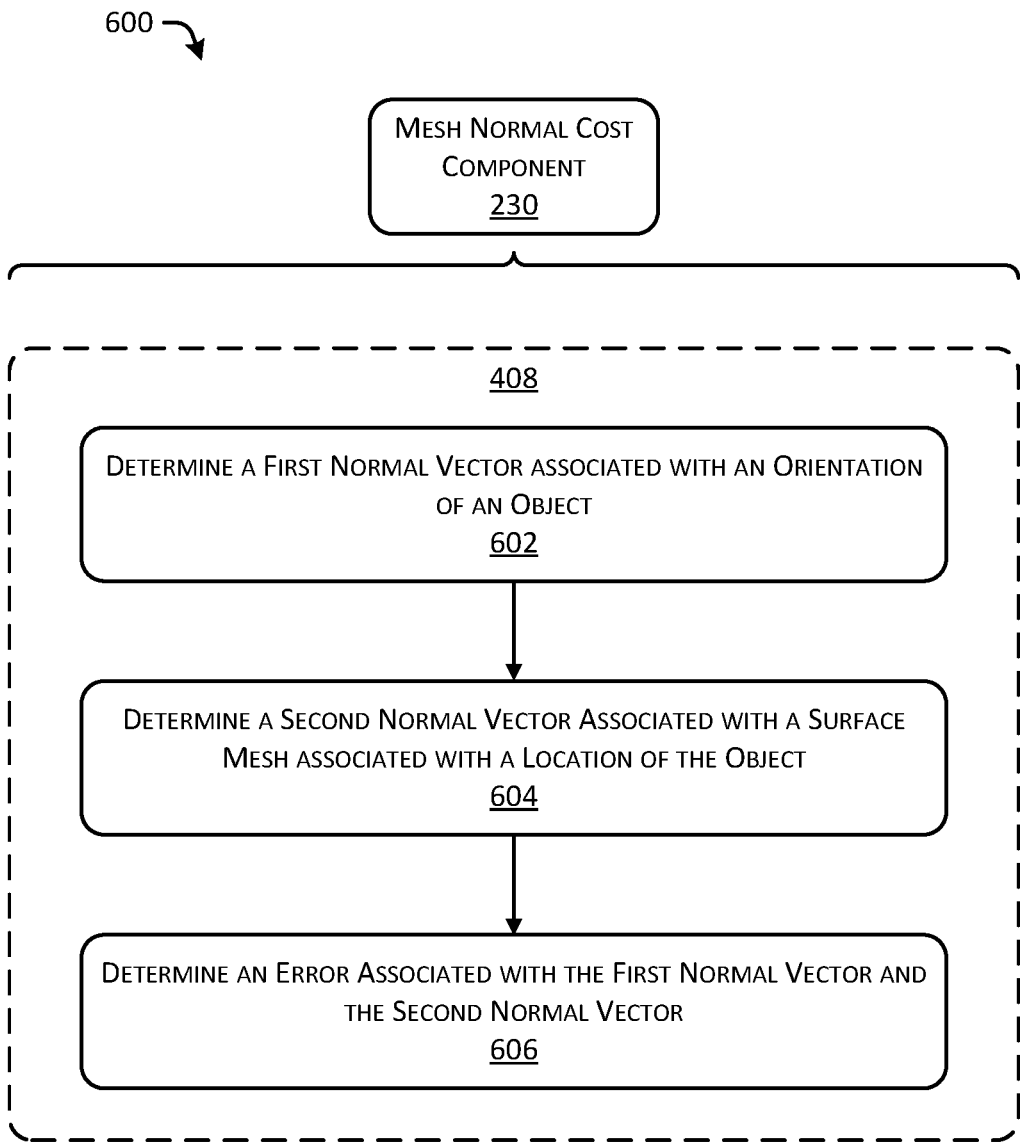
FIG. 6 depicts an example process for determining a mesh normal cost for determining an object orientation based on image data and object contact points, as discussed herein.

FIG. 6 depicts an example process 600 for determining a mesh normal cost for determining an object orientation based on image data and object contact points, as discussed herein. For example, some or all of the process 600 can be performed by one or more components in the FIG. 2 or 9, as described herein. For example, some or all of the process 600 can be performed by the mesh normal cost component 230.

At operation 602, the process can include determining a first normal vector associated with an orientation of an object. For example, the operation 602 can include determining or receiving the estimated unprojected locations of object contact points onto a three-dimensional surface mesh. In some instances, the operation 602 can include selecting various points within a plane associated with or defined at least in part by the estimated unprojected locations and determining the first normal vector associated with the plane. In some instances, the operation 602 can include performing a principle component analysis or an eigenvalue decomposition to determine the normal vector. In other examples, three of the four object contact points may be used to form two vectors. A normalized cross product of the two resulting vectors may be used as the normal vector.

At operation 604, the process can include determining a second normal vector associated with a surface mesh associated with a location of the object. For example, the operation 604 can include determining points under the location of the object, and determining a plane associated with the points. In some instances, determining point under the location of the object can include sampling points in image space, unprojecting those points onto the mesh, and determining a second singular vector associated with the points. Further, the operation can include determining the second normal vector associated with the plane associated with the surface mesh. In some instances, the operation 604 can include performing a principle component analysis or an eigenvalue decomposition to determine the normal vector. Additionally, or alternatively, such a surface normal vector may be determined by calculating cross products of vectors associated with points on the mesh located proximate to, or within a range of, the object contact points.

At operation 606, the process can include determining an error associated with the first normal vector and the second normal vector. In some instance, the error can be based at least in part on the difference between the first normal vector and the second normal vector. In some examples, the error (or cost), can be determined as a dot product between the two normal vectors. In some instances, as the orientation of the object is updated over time as a result of one or more optimization operations, the process 600 can be performed to determine an updated error based on the updated orientation and/or based on the object corresponding to an updated location on the surface mesh.

Figure 7:
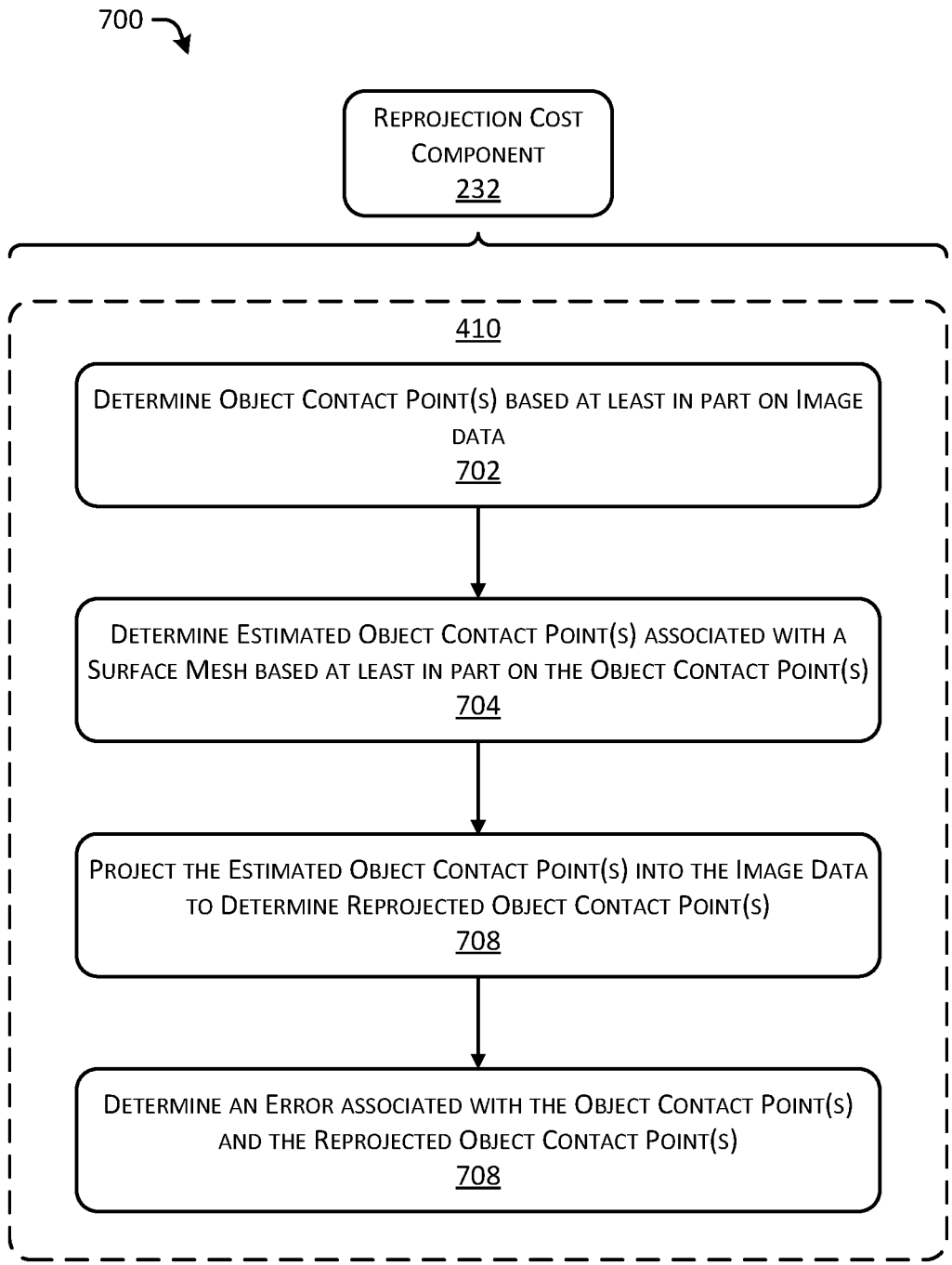
FIG. 7 depicts an example process for determining a reprojection cost for determining an object orientation based on image data and object contact points, as discussed herein.

FIG. 7 depicts an example process 700 for determining a reprojection cost for determining an object orientation based on image data and object contact points, as discussed herein. For example, some or all of the process 700 can be performed by one or more components in the FIG. 2 or 9, as described herein. For example, some or all of the process 700 can be performed by the reprojection cost component 232.

At operation 702, the process can include determining object contact point(s) based at least in part on image data. For example, as discussed herein, the operation 702 can include receiving image data and inputting the image data to an algorithm such as a neural network trained to identify such object contact point(s) (e.g., object contact points) and an associated uncertainty.

At operation 704, the process can include determining estimated object contact point(s) associated with a surface mesh based at least in part on the object contact point(s). In some instances, the estimated object contact point(s) may be located on or above the surface mesh. For example, the operation 704 can include unprojecting, as initial unprojected object contact point(s), the object contact point(s) onto a surface mesh, and updating, as the estimated object contact point(s), the locations of the unprojected object contact point(s) based on the optimization operations, as discussed herein.

At operation 706, the process can include projecting the estimated object contact point(s) from the mesh into the image data to determine reprojected object contact point(s). For example, the operation 706 can include a projection operation using the intrinsics and extrinsics of the image sensor to determine a location of the estimated object contact point(s) in an image plane of the image data of the operation 702.

At operation 708, the process can include determining an error (or cost) associated with the object contact point(s) and the reprojected object contact point(s). For example, the operation 708 can include determining a sum of Euclidian distances between the object contact point(s) and the reprojected estimated wheel contact point(s) as represented in the image data.

Figure 8:
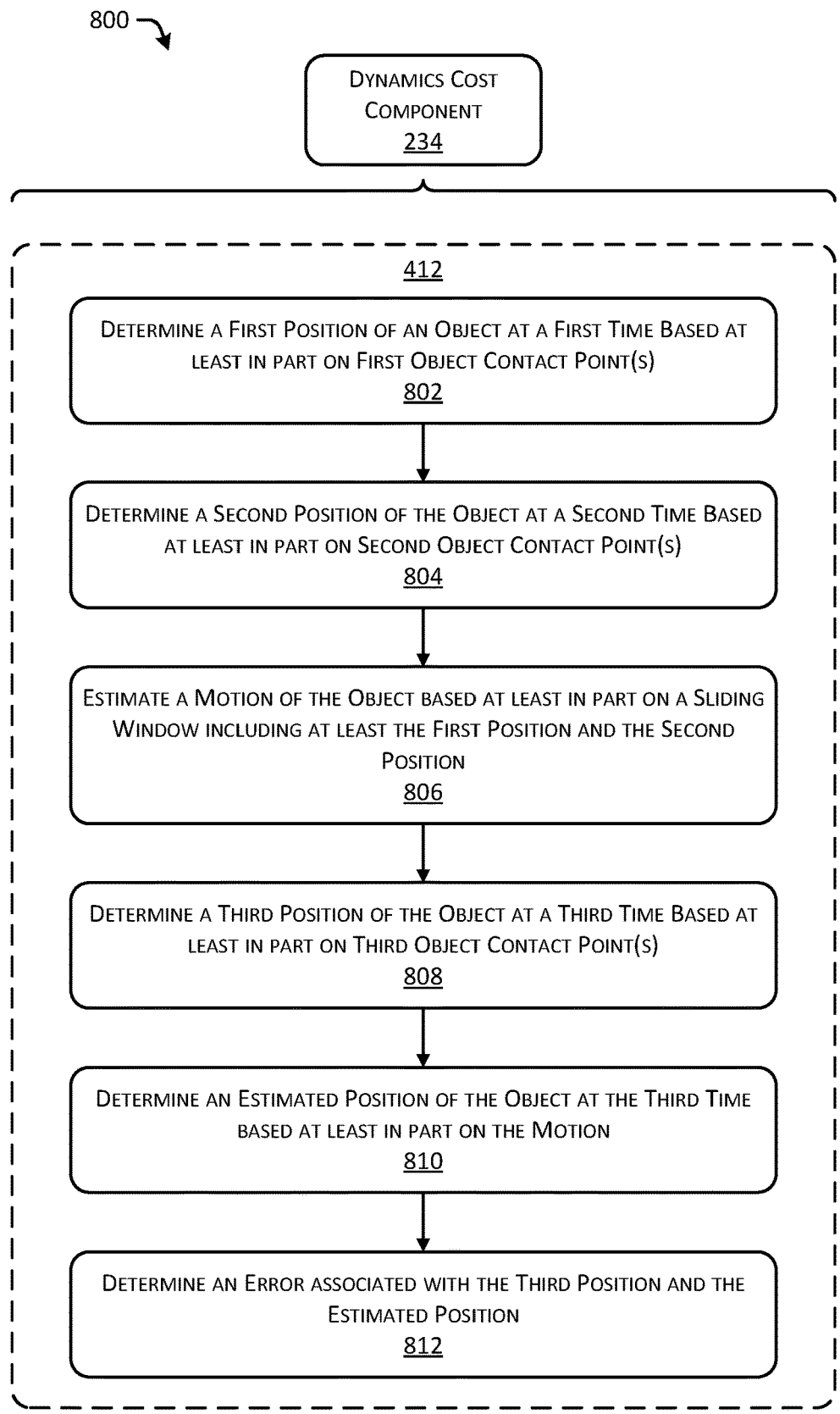
FIG. 8 depicts an example process for determining a dynamics cost for determining an object orientation based on image data and object contact points, as discussed herein.

FIG. 8 depicts an example process 800 for determining a dynamics cost for determining an object position and/or orientation based on image data and object contact points, as discussed herein. For example, some or all of the process 800 can be performed by one or more components in the FIG. 2 or 9, as described herein. For example, some or all of the process 800 can be performed by the dynamics cost component 234.

At operation 802, the process can include determining a first position of an object at a first time based at least in part on first object contact point(s). For example, the operation 802 can include capturing image data, determining the object contact point(s) based at least in part on the image data, determining rays associated with the object contact points, unprojecting the rays onto a three-dimensional surface, and determining a first position of the object, as discussed herein.

At operation 804, the process can include determining a second position of the object at a second time based at least in part on second object contact point(s). For example, the second time can be a time after the first time, as discussed above in the operation 802. The operation 804 can include performing similar operations as discussed herein to determine the second position at the second time.

At operation 806, the process can include estimating a motion of the object based at least in part on a sliding window including at least the first position and the second position. For example, a velocity and/or acceleration of the object can be estimated based at least in part on positions of the object in the preceding frames. For example, a next distance can be based at least in part on a previous location extrapolated based on an observed velocity and/or acceleration of the object and/or based on a physical model associated with rigid bodies. In some instances, the sliding window can ingest N frames, where N is an integer. In some instances, the sliding window can include 10 frames. Thus, in an example where an image sensor captures image data every 10 milliseconds, the sliding window can analyze data covering a time period of 100 milliseconds. Of course, the aforementioned sliding window is an example, and any size sliding window and any frequency of capturing images can be used. In those examples which use a sliding window, the costs determined by the other operations (e.g., any of operations 406, 408, and 410), may be the total cost, average cost, or otherwise for each operation over all N frames.

At operation 808, the process can include determining a third position of the object at a third time based at least in part on third object contact point(s). For example, the third time can be a time after the second time, as discussed above in the operation 804. The operation 808 can include performing similar operations as discussed herein to determine the third position at the third time.

At operation 810, the process can include determining an estimated position of the object at the third time based at least in part on the motion. For example, the operation 810 can include extrapolating the position of the object at the second time by adding or updating the second position based at least in part on the motion.

At operation 812, the process can include determining an error associated with the third position and the estimated position. For example, the error can represent a difference in positions and/or orientations determined from the third object contact points and the estimated position, as discussed herein.

Figure 9:
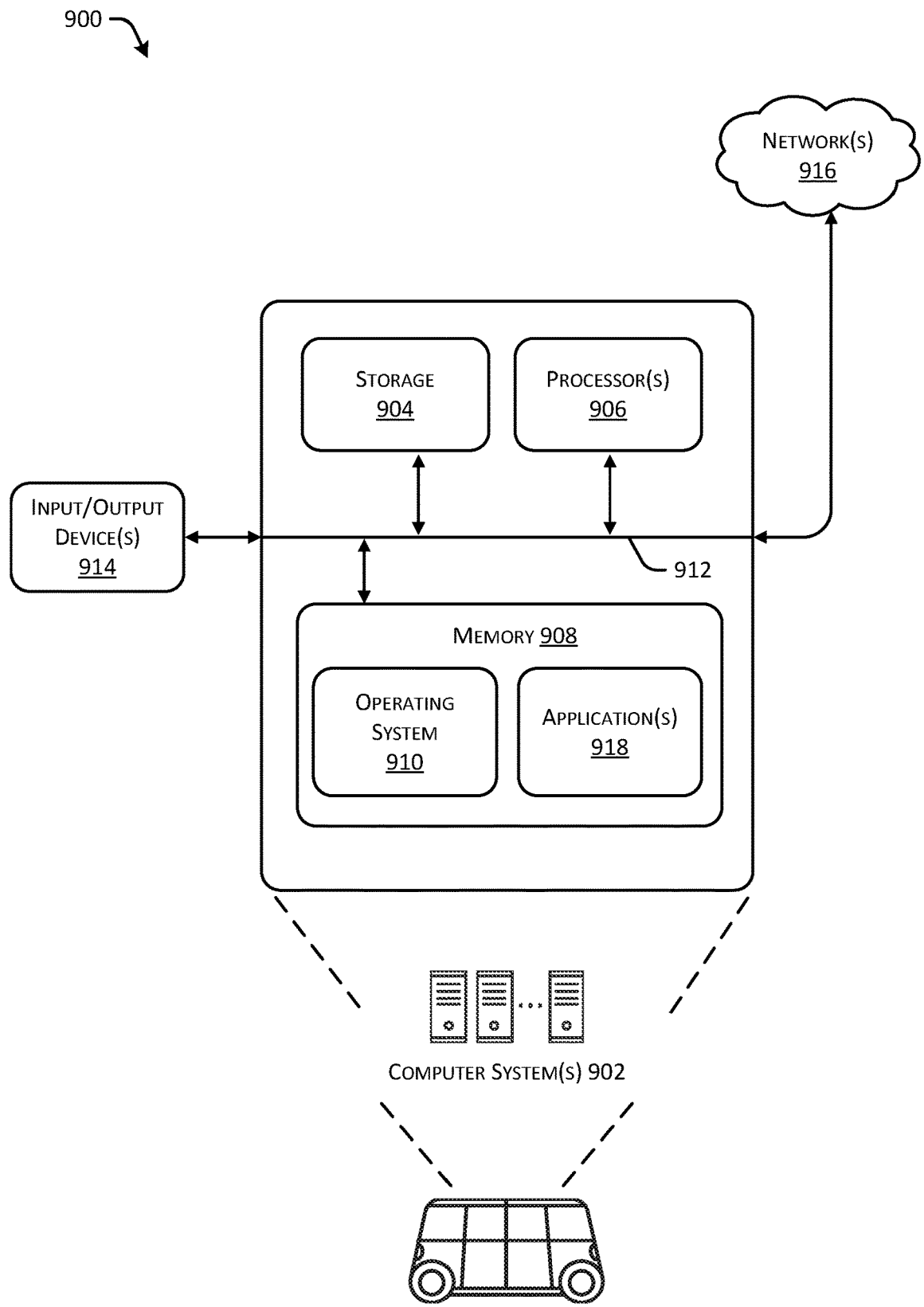
FIG. 9 depicts a block diagram of an example computer system for implementing the techniques described herein.

FIG. 9 illustrates an environment 900 in which the disclosures may be implemented in whole or in part. The environment 900 depicts one or more computer systems 902 that comprise a storage 904, one or more processor(s) 906, a memory 908, and an operating system 910. The storage 904, the processor(s) 906, the memory 908, and the operating system 910 may be communicatively coupled over a communication infrastructure 912. Optionally, the computer system 902 may interact with a user, or environment, via input/output (I/O) device(s) 914, as well as one or more other computing devices over a network 916, via the communication infrastructure 912. The operating system 910 may interact with other components to control one or more applications 918.

As can be understood in the context of this disclosure, the computer system 902 can be implemented in an autonomous vehicle, a semi-autonomous vehicle, or any other vehicle.

In some instances, the computer system(s) 902 may implement (at least in part) the functions of the architecture 200, as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 9. A processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computing device.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as modem cell phones with processing capability, wireless email devices including BlackBerry™ devices), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™ JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system comprises: one or more processors; and one or more computer-readable media storing instructions executable by the one or more processors, wherein the instructions program the one or more processors to: receive image data captured by at least one image sensor, the image data including a representation of an object; determine a plurality of object contact points associated with the object, an object contact point of the plurality of object contact points representing a point of contact between a portion of the object and a ground surface; determine an intersection of a ray associated with the object contact point with a three-dimensional surface mesh to determine an estimated location of the object contact point with respect to the three-dimensional surface mesh; determine a three-dimensional bounding box associated with the object based at least in part on the intersection; and generate a trajectory for a vehicle to follow based at least in part on the three-dimensional bounding box associated with the object.

B. The system as paragraph A recites, wherein the instructions, when executed by the one or more processors, further program the one or more processors to: determine a two-dimensional bounding box associated with the object represented in the image data; and determine the plurality of object contact points based at least in part on the two-dimensional bounding box associated with the object.

C. The system as paragraph A or B recites, wherein the instructions, when executed by the one or more processors, further program the one or more processors to: determine the ray having an origin associated with the at least one image sensor and passing in a direction of the object contact point.

D. The system as any one of paragraphs A-C recite, wherein the instructions, when executed by the one or more processors, further program the one or more processors to: determine a first uncertainty associated with the object contact point associated with the image data; and determine a second uncertainty associated with the estimated location of the object contact point with respect to the three-dimensional surface mesh based at least in part on the first uncertainty.

E. The system as any one of paragraphs A-D recite, wherein the instructions, when executed by the one or more processors, further program the one or more processors to: determine a first normal vector associated with the three-dimensional bounding box associated with the object; determine a second normal vector associated with a location on the three-dimensional surface mesh associated with the object; and determine an error based at least in part on a difference between the first normal vector and the second normal vector.

F. The system as any one of paragraphs A-E recite, wherein the three-dimensional bounding box associated with the object is a first three-dimensional bounding box at a first time; and wherein the instructions, when executed by the one or more processors, further program the one or more processors to: determine one or more additional three-dimensional bounding boxes associated with the object at one or more additional times; and determine a velocity associated with the object based at least in part on the first three-dimensional bounding box and the one or more additional three-dimensional bounding boxes.

G. The system as paragraph F recites, wherein the instructions, when executed by the one or more processors, further program the one or more processors to: determine the velocity based at least in part on a physics-based model.

H. The system as any one of paragraphs A-G recite, wherein the instructions, when executed by the one or more processors, further program the one or more processors to: determine the plurality of object contact points associated with the object based at least in part on a machine learning model configured to detect object contact points represented in image data.

I. A method comprises: receiving image data representing at least one object; determining one or more object contact points associated with the at least one object and a surface represented in the image data; unprojecting, as one or more rays, the one or more object contact points to determine one or more intersection points with a three-dimensional surface; and determining a bounding box representing the object based at least in part on the one or more intersection points.

J. The method as paragraph I recites, further comprising: determining a first uncertainty associated with an object contact point of the one or more object contact points; determining a second uncertainty associated with an intersection point of the one or more intersection points corresponding to the object contact point, wherein the second uncertainty is based at least in part on the first uncertainty; and determining the bounding box based at least in part on the second uncertainty.

K. The method as paragraph J recites, further comprising: determining the second uncertainty based at least in part on an unscented transform.

L. The method as paragraph J recites, further comprising: determining the bounding box based at least in part on at least one cost function evaluated over a sliding data window.

M. The method any one of paragraphs I-L recite, wherein the bounding box associated with the object is a first bounding box that represents the object at a first time; and wherein the method further comprises: determining a second bounding box that represents the at least one object at a second time; and determining a velocity associated with the at least one object based at least in part on the first bounding box and the second bounding box evaluated over a sliding data window.

N. The method any one of paragraphs I-M recite, further comprising: determining the one or more object contact points associated with the at least one object based at least in part on a machine learning model configured to detect object contact points represented in image data, wherein an individual contact point of the one or more object contact points is associated with an uncertainty.

O. The method any one of paragraphs I-N recite, wherein the at least one object is a vehicle, the method further comprising: determining an identity of an object contact point of the one or more object contact points with respect to a direction of travel of the vehicle; determining whether the object contact point is occluded; and determining an uncertainty associated with a location of the object contact point.

P. The method any one of paragraphs I-O recite, further comprising: receiving the image data from at least one image sensor of an autonomous vehicle; determining a location of the autonomous vehicle with respect to the three-dimensional surface; and unprojecting the one or more object contact points onto the three-dimensional surface based at least in part on the location of the autonomous vehicle.

Q. A non-transitory computer-readable medium stores instructions that, when executed, cause one or more processors to perform operations comprising: receiving image data representing at least one object; determining a plurality of object contact points of an object and a surface in the image data; unprojecting, as a plurality of unprojected points, the plurality of object contact points into a reference frame associated with a three-dimensional surface; determining a cost based on one or more of the plurality of object contact points or the plurality of unprojected points; determining a three-dimensional bounding box representing the object based at least in part on an optimization of the cost; and generating a command to control an autonomous vehicle based at least in part on the three-dimensional bounding box.

R. The non-transitory computer-readable medium as paragraph Q recites, the operations further comprising: receiving the image data from at least one image sensor; extracting, from an object detector, a region of the image data associated with the object; passing the region of the image data into a machine learning model configured to determine contact points; receiving, from the machine learning model, the plurality of object contact points, an object contact point of the plurality of object contact points indicating a location in the image data where the object touches the three-dimensional surface; determining, for the object contact point of the plurality of object contact points, a ray having an origin associated with the at least one image sensor and associated with the object contact point; and unprojecting the ray into the reference frame associated with the three-dimensional surface to determine an intersection point between the ray and the three-dimensional surface.

S. The non-transitory computer-readable medium as paragraph R recites, wherein the three-dimensional bounding box associated with the object is a first three-dimensional bounding box that represents the object at a first time, the operations further comprising: determining a second three-dimensional bounding box that represents the object at a second time; and determining a velocity associated with the object based at least in part on the first three-dimensional bounding box and the second three-dimensional bounding box evaluated over a sliding data window.

T. The non-transitory computer-readable medium as any one of paragraphs Q-S recite, wherein the object is a vehicle, and further wherein the cost comprises a sum of: a ray casting cost based at least in part on an unscented transform; a reprojection cost based at least in part a distance between a projected point and an object contact point of the plurality of object contact points; a surface normal cost based at least in part on a difference in orientations of a first plane associated with the vehicle and a second plane associated with the three-dimensional surface; and a dynamics cost based at least in part on evaluating a motion of the vehicle over time.

While the example clauses described above are described with respect to one particular implementation, it should be understood that, in the context of this document, the content of the example clauses can also be implemented via a method, device, system, and/or computer-readable medium.

What is claimed is:
1. A system comprising:
one or more processors; and one or more computer-readable media storing instructions executable by the one or more processors, wherein the instructions program the one or more processors to:
receive image data captured by at least one image sensor, the image data including a representation of an object;
determine a plurality of object contact points in the image data associated with the object, the plurality of object contact points representing respective points of contact between respective portions of the object and a ground surface;
determine an intersection of a ray associated with an object contact point of the plurality of object contact points with a three-dimensional surface mesh to determine an estimated location of the object contact point with respect to the three-dimensional surface mesh;
determine a three-dimensional bounding box associated with the object based at least in part on the intersection; and
generate a trajectory for a vehicle to follow based at least in part on the three-dimensional bounding box associated with the object.

2. The system of claim 1, wherein the instructions, when executed by the one or more processors, further program the one or more processors to:
determine a two-dimensional bounding box associated with the object represented in the image data; and
determine the plurality of object contact points based at least in part on the two-dimensional bounding box associated with the object.

3. The system of claim 1, wherein the instructions, when executed by the one or more processors, further program the one or more processors to:
determine the ray having an origin associated with the at least one image sensor and passing in a direction of the object contact point.

4. The system of claim 1, wherein the instructions, when executed by the one or more processors, further program the one or more processors to:
determine a first uncertainty associated with the object contact point associated with the image data; and
determine a second uncertainty associated with the estimated location of the object contact point with respect to the three-dimensional surface mesh based at least in part on the first uncertainty.

5. The system of claim 1, wherein the instructions, when executed by the one or more processors, further program the one or more processors to:
determine a first normal vector associated with the three-dimensional bounding box associated with the object;
determine a second normal vector associated with a location on the three-dimensional surface mesh associated with the object; and
determine an error based at least in part on a difference between the first normal vector and the second normal vector.

6. The system of claim 1, wherein the three-dimensional bounding box associated with the object is a first three-dimensional bounding box at a first time; and
wherein the instructions, when executed by the one or more processors, further program the one or more processors to:
determine one or more additional three-dimensional bounding boxes associated with the object at one or more additional times; and
determine a velocity associated with the object based at least in part on the first three-dimensional bounding box and the one or more additional three-dimensional bounding boxes.

7. The system of claim 6, wherein the instructions, when executed by the one or more processors, further program the one or more processors to:
determine the velocity based at least in part on a physics-based model.

8. The system of claim 1, wherein the instructions, when executed by the one or more processors, further program the one or more processors to:
determine the plurality of object contact points associated with the object based at least in part on a machine learning model configured to detect object contact points represented in image data.

9. A method comprising:
receiving image data representing at least one object and a surface;
determining, in the image data, a plurality of object contact points associated with the at least one object and the surface represented in the image data;
unprojecting, as one or more rays, one or more object contact points of the plurality of object contact points to determine one or more intersection points with a three-dimensional surface;
determining a bounding box representing the object based at least in part on the one or more intersection points;
generating a trajectory for a vehicle to follow based at least in part on the bounding box representing the object;
determining a first uncertainty associated with an object contact point of the one or more object contact points;
determining a second uncertainty associated with an intersection point of the one or more intersection points corresponding to the object contact point, wherein the second uncertainty is based at least in part of the first uncertainty; and
determining the bounding box based at least in part of the second uncertainty.

10. The method of claim 9, further comprising:
determining the second uncertainty based at least in part on an unscented transform.

11. The method of claim 9, further comprising:
determining the bounding box based at least in part on at least one cost function evaluated over a sliding data window.

12. The method of claim 9, wherein the bounding box associated with the object is a first bounding box that represents the object at a first time; and
wherein the method further comprises:
determining a second bounding box that represents the at least one object at a second time; and
determining a velocity associated with the at least one object based at least in part on the first bounding box and the second bounding box evaluated over a sliding data window.

13. The method of claim 9, further comprising:
determining the one or more object contact points associated with the at least one object based at least in part on a machine learning model configured to detect object contact points represented in image data, wherein an individual contact point of the one or more object contact points is associated with an uncertainty.

14. The method of claim 9, wherein the vehicle is a first vehicle, and wherein the at least one object is a second vehicle, the method further comprising:

determining an identity of an object contact point of the one or more object contact points with respect to a direction of travel of the second vehicle;

determining whether the object contact point is occluded; and determining an uncertainty associated with a location of the object contact point.

15. The method of claim 9, wherein the vehicle is an autonomous vehicle, the method further comprising:

receiving the image data from at least one image sensor of the autonomous vehicle;

determining a location of the autonomous vehicle with respect to the three-dimensional surface; and unprojecting the one or more object contact points onto the three-dimensional surface based at least in part on the location of the autonomous vehicle.

16. A non-transitory computer-readable medium storing instructions that, when executed, cause one or more processors to perform operations comprising:

receiving image data from an image sensor representing an object on a surface in an environment;

determining, in the image data, a plurality of object contact points associated with the object and the surface represented in the image data;

determining a plurality of intersection points, an intersection point of the plurality of intersection points comprising a three-dimensional location of an intersection of a ray with a three-dimensional surface, the ray originating at an origin associated with the image sensor and passing through an object contact point of the plurality of object contact points;

determining a bounding box representing the object based at least in part on the plurality of intersection points; and generating a trajectory for a vehicle to follow based at least in part on the bounding box representing the object.

17. The non-transitory computer-readable medium of claim 16, the operations further comprising:

determining a first uncertainty associated with the object contact point;

determining a second uncertainty associated with the intersection point corresponding to the object contact point, wherein the second uncertainty is based at least in part on the first uncertainty; and determining the bounding box based at least in part on the second uncertainty.

18. The non-transitory computer-readable medium of claim 17, the operations further comprising:

determining the second uncertainty based at least in part on an unscented transform.

19. The non-transitory computer-readable medium of claim 17, the operations further comprising:

determining the bounding box based at least in part on at least one cost function evaluated over a sliding data window.

* * * * *